March 20, 1956     J. F. EUBANK     2,738,753
SPEED AND RANGE INDICATOR FOR MOTOR VEHICLES
Filed Feb. 25, 1955
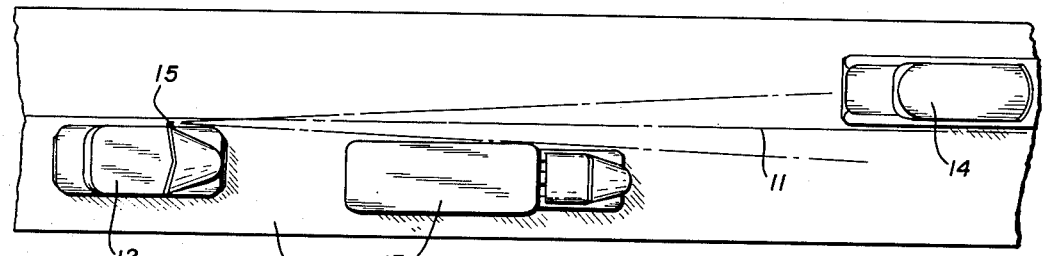
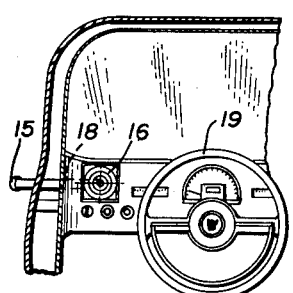
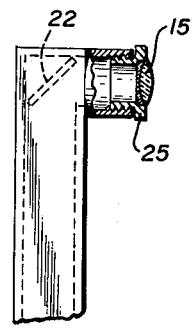
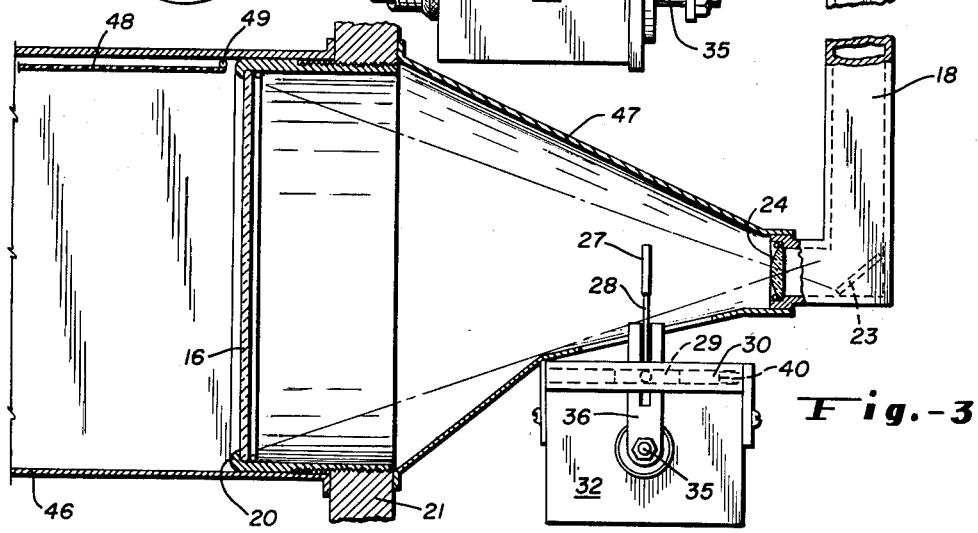
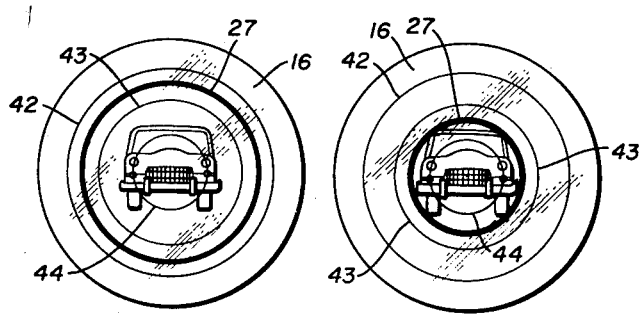
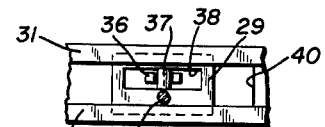
INVENTOR.
James F. Eubank
BY
ATTORNEYS

United States Patent Office 2,738,753
Patented Mar. 20, 1956

2,738,753

SPEED AND RANGE INDICATOR FOR MOTOR VEHICLES

James F. Eubank, Denver, Colo.

Application February 25, 1955, Serial No. 490,569

7 Claims. (Cl. 116—57)

This invention relates to indicating devices for automotive vehicles and particularly to a speed and range indicator for determining safe passing conditions with respect to oncoming vehicles.

In order to handle a motor vehicle with reasonable safety, it is necessary that the driver acquire excellent judgment of distances and speeds within wide ranges. It is particularly desirable to acquire good judgment with respect to the speed and distance of an oncoming vehicle when a driver is about to pass a vehicle immediately in front. The safe passing conditions are determined not only by the speed of the driver's vehicle but also by the speed and distance of the oncoming vehicle. Information as to the relative speeds of the driver's vehicle and the oncoming vehicle is helpful in judging the safe distance and time for passing. Accordingly, it is an object of this invention to provide a vehicle instrument for indicating the relative speed and distance of an oncoming vehicle.

It is another object of this invention to provide a vehicle speed indicating instrument including an indication of the distance to an approaching vehicle and the relative speeds of the vehicles.

Further objects and advantages of this invention will become apparent as the following description proceeds and the features of novelty which characterize the invention will be pointed out with particularity in the claims annexed to and forming a part of this specification.

Briefly, in carrying out the objects of this invention in one embodiment a motor vehicle is provided with an optical viewing system including a viewing screen located directly in front of the driver preferably on the instrument panel, and which presents a centered image of an oncoming vehicle. The optical system includes an objective lens located at the side of the vehicle so that the view ahead is relatively unobstructed by vehicles immediately in front of the driver's vehicle. The viewing screen is provided with a series of concentric circles, and a circular hollow frame is interposed in the optical system in a manner such that it presents an image on the viewing screen which is concentric with the series of circles. The hollow frame is mounted to move along the optical axis of the system and is connected to be moved by the speedometer of the car so that the image of the frame is decreased in size with increased speed of the vehicle. The system is calibrated so that the image of an approaching car will lie within the circular image of the hollow frame when the approaching vehicle is at a distance sufficient to allow safe passing of a vehicle immediately in front of the driver's vehicle. Whenever the relative speeds of the two vehicles are such that the image of the approaching vehicle cannot be kept within the image of the circular frame, conditions are not safe for passing.

For a better understanding of this invention, reference may be had to the accompanying drawing in which:

Fig. 1 is a diagrammatic view of a vehicle equipped with an instrument embodying the invention on a highway;

Fig. 2 is an enlarged view of a portion of the vehicle showing the position of the instrument;

Fig. 3 is an enlarged detail view partly in section of the instrument of the invention;

Fig. 4 is an end elevation view partly in section of a portion of the instrument of Fig. 3;

Fig. 5 is a top plan view of the portion of the instrument shown in Fig. 4; and

Figs. 6 and 7 are views illustrating the instrument in use.

Referring now to the drawing, Fig. 1 is a diagrammatic view looking down on a highway 10 having a center line 11 and on which three vehicles 12, 13, and 14 are traveling. The vehicles 12 and 13 are traveling in the same direction and the vehicle 14 is approaching from the opposite direction. The vehicle 12 is provided with an instrument embodying the present invention and including a sighting or objective lens 15 mounted on the left side of the vehicle and through which a view of the highway ahead and to the side of the vehicle 13 may be obtained. The instrument is arranged to provide an indication of the speed of the vehicle 12 and the distance to the vehicle 14, and also serves to indicate the relative speeds of the vehicles and whether the conditions are safe for passing.

In Fig. 2 the position of the instrument with respect to the driver is indicated; the instrument comprises the objective lens 15 and a frosted glass panel or viewing screen 16 mounted on the control panel of the vehicle and linked with the objective 15 by an optical system arranged within tubing 18. As clearly shown in this figure, the viewing screen 16 may be seen by the driver at the left-hand side of the steering wheel, indicated at 19. The screen 16 provides a continuous view forward along the left-hand side of the road and vehicles approaching on the left-hand side of the road appear as images generally in the central portion of the screen 16, the size of the image of the approaching vehicle increasing as the vehicle approaches and the position varying from center with the curves and slopes of the road.

The construction of the instrument and the manner in which it operates will be more readily understood from a consideration of the detail views, Figs. 3, 4, and 5. As shown in Fig. 3 the viewing screen 16 is mounted in a cylindrical retaining member 20 which is threaded into a mounting ring or frame 21 mounted on the body of the vehicle in any suitable manner. The optical system includes the objective lens 15 and the tube 18 which is made of straight sections and includes two right-angled turns provided with reflectors 22 and 23 respectively. Light rays received through the objective 15 pass through the tube 18 they being reflected at right angles by the 45 degree reflectors 22 and 23 and thence through an erecting lens 24. The objective lens 15 is of the compound condensing type and may be focused by turning its mounting collar, indicated at 25, which is threaded on the tubular structure 18. The viewing screen 16 may also be focused with respect to the lens 24 by moving it in and out by rotation of the threaded mounting 21. The optical system is focused to give a clear view of the road ahead of the vehicle and so that approaching vehicles appear as clear images focused on the viewing screen 16. As shown in Figs. 3 and 4, a hollow, circular frame or ring 27 is mounted transversely of the central optical axis of the lens 24 and is centered with respect to this axis and the center of the screen 16. The frame 27 is mounted on a support 28 and is constrained to move along the optical axis by a foot or guide member 29 which slides between a pair of channel shaped guide tracks 30 and 31. The support 28 is maintained upright, it being rigidly secured to the guide foot 29.

The movement of the hollow frame 27 along the optical axis is controlled by operation of the speedometer of the motor vehicle, indicated generally at 32. The speedometer 32 is driven by a flexible cable 33 housed in a flexible tube or sheath 34 in the usual manner. Operation of the speedometer rotates a shaft 35 which is provided with a forked arm 36; the forked arm is offset with respect to the shaft 28, as shown in Fig. 4, and engages a roller 37 mounted on a cross shaft within an opening 38 in the guide member 29. The two fingers of the forked arm 36 are spaced apart a distance slightly greater than the width of the roller 37 and, as the arm moves, only one side thereof is in contact with the roller. As viewed in Fig. 3, the speedometer arm 36 moves clockwise on a decrease in speed and counterclockwise on an increase in speed. In the zero position the arm 36 comes to rest against the end support 40 of the guide tracks 30 and 31 which acts as a stop. Because the circular frame 27 moves toward the screen 16 upon an increase in speed, the image thereof on the screen becomes smaller as the speed increases. Thus at the highest vehicle speed, the image of the frame 27 will be at its smallest.

The dimensions of the frame 27 are selected with respect to the characteristics of the optical system, so that at the maximum speed of the vehicle the image of an approaching vehicle at a sufficient distance to be safe for passing will lie within the image of the frame 27. In determining the dimensions of the ring 27 all sizes of vehicles must be taken into account and the ring designed so that small vehicles will produce images larger than the ring at unsafe passing distances. Night driving conditions and the variations in headlight spacing must also be taken into account. As the vehicle speed is reduced and passing becomes safe at lesser distances, the frame 27 moves away from the screen so that the image of the approaching car may be larger in the safe passing condition. Because the position of the frame 27 varies directly with the speed of the vehicle, the screen 16 may be marked with concentric circles such as those indicated in Figs. 6 and 7 at 42, 43, and 44, each of which represents a predetermined speed of the vehicle, so that when the vehicle attains the speed indicated by one of the rings, the image in the hollow frame 27 will coincide with the respective circle 42, 43, or 44. The size of the image of the hollow frame is, therefore, an indication of the speed of the vehicle, as well as a means for judging the safety of attempting to pass a vehicle immediately in front when another vehicle is approaching on the other side of the road. Because the safeness of the passing condition also depends upon the speed of the approaching vehicle, the size of the image of the approaching vehicle will increase in proportion to the rate of approach; the operator can readily observe this increase in size and, therefore, can judge the relative speed of the two vehicles, since the rate of the approach of the size of the approaching vehicle to the image of the hollow frame will indicate whether it is safe to pass, a rapid rate of increase being an indication that the image of the approaching vehicle may exceed the image of the ring in size before the vehicle in front can be passed. An operator of the vehicle on which an instrument of this type is mounted will become accustomed to the rate of change of size of the image of the approaching vehicle and thus will be able to judge whether the image will stay within the hollow frame over a sufficient period to enable the passing operation to be completed.

Fig. 6 indicates the appearance of the viewing screen 16 under safe passing conditions, the image of the car being well within the confines of the ring 27. In Fig. 7 passing conditions are not safe because the image of the car touches the ring 27. The two Figs. 6 and 7 are drawn to indicate the approaching vehicle as of the same size, that is, at the same distance from the driver's vehicle, but with the speed of the driving vehicle lower in Fig. 6 than in Fig. 7.

For daytime observation of the screen 16 it is desirable that the light falling on the screen be minimized and a light shield 46 may be provided about the screen as indicated, the shield being an open ended cylinder mounted on the vehicle adjacent the mounting of the screen 16. It is also desirable to shield the area between the lens 24 and the screen 16, and for this purpose a light shield 47 of generally conical configuration is employed, a suitable slot being provided to accommodate the shaft 28 of the speedometer mechanism.

It will readily be understood that the optical system should have excellent light gathering properties in order to provide as great an illumination as possible of the screen 16 and clear images of the road ahead. Coating of the lens 15 is desirable in order to increase the illumination of the screen 16 and minimize the reflection of lights from the objective lens. During night driving conditions, it may be found desirable to provide a colored screen or shield in order to cut down the glare from approaching headlights. A screen of this type may be located within the hood 46 as indicated at 48, the screen being pivoted along an axis 49 at the top of the hood 46. The hood preferably is made of rectangular form to permit the pivoting of the screen 48 into position in the upper portion of the hood out of the line of sight of the driver.

While the invention has been described in connection with a specific arrangement and construction of the components, various applications and modifications will occur to those skilled in the art. Therefore, it is not desired that the invention be limited to the specific features illustrated and described and it is intended by the appended claims to cover all modifications involved in the spirit and scope of the invention.

I claim:

1. A relative speed and range indicator for vehicles comprising an optical viewing system including a viewing screen mounted on the vehicle for presenting an image of an approaching vehicle, a hollow frame member interposed transversely of the optical path of said system to provide an image of the frame on said viewing screen, means responsive to the speed of the vehicle for moving said frame member along the optical path of said system to vary the size of the image thereof on said screen, said means moving said frame in a direction to produce a smaller image upon increase in speed and vice versa, the size of said frame being selected with respect to the size of the vehicle image on said screen so that at safe passing distances the image of the oncoming vehicle will be smaller and will appear within the image of said frame.

2. An indicator for vehicles as set forth in claim 1 wherein said viewing screen is mounted on the dashboard of the vehicle and said optical system includes an objective lens mounted outside the car at one side thereof in a position to give a clear view forward and to the side of a vehicle traveling immediately in front of the vehicle on which the system is mounted.

3. An indicator for vehicles as set forth in claim 1 including a longitudinal guide for confining said frame member to movement along a path parallel to the optical axis of said system and for holding said frame in a plane normal to said path.

4. A vehicle indicator as set forth in claim 3 wherein said frame moving means includes a rotary arm connected to be driven by the speedometer of the vehicle and a lost motion connection between said frame and said arm.

5. A speed and range indicator for vehicles as set forth in claim 1 wherein said hollow frame is circular and said viewing screen is marked with concentric spaced circles indicating predetermined speeds of the vehicle when the image of said frame is in coincidence therewith.

6. A relative speed and range indicator for vehicles comprising an optical viewing system including a viewing screen mounted on the vehicle for presenting an image of an approaching vehicle, means responsive to the speed of the vehicle for presenting on said screen in substantial concentricity with the image of the approaching vehicle a representation of an area varying in size inversely with the speed of the vehicle, the size of said area being selected with respect to the size of the image on said screen so that at safe passing distances the image of the approaching vehicle will be smaller and will appear within the representation of said area.

7. A relative speed and range indicator for vehicles comprising an optical viewing system including a viewing screen mounted on the vehicle for presenting an image of an approaching vehicle, means interposed transversely of the optical path of said system to provide a representation of an area on said viewing screen, means responsive to the speed of the vehicle for moving said interposed means along the optical path of said system to vary the size of said area representation on said screen, said speed responsive means moving said interposed means in a direction to produce a smaller area representation upon an increase in speed and vice versa, the size of said area being selected with respect to the size of the image on said screen so that at safe passing distances the image of the approaching vehicle will be smaller and will appear within the representation of said area.

No references cited.